(12) United States Patent
Kim et al.

(10) Patent No.: US 8,282,196 B2
(45) Date of Patent: Oct. 9, 2012

(54) MICRO ELECTRO MECHANICAL SYSTEM DEVICE AND METHOD OF MANUFACTURING THE SAME

(75) Inventors: Il Woo Kim, Seocho-gu (KR); Byung Ha Park, Suwon-si (KR); Moon Chul Lee, Yongin-si (KR); Dong Sik Shim, Suwon-si (KR); Kyong Il Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1227 days.

(21) Appl. No.: 12/058,946

(22) Filed: Mar. 31, 2008

(65) Prior Publication Data

US 2008/0283495 A1    Nov. 20, 2008

(30) Foreign Application Priority Data

May 17, 2007   (KR) ................. 10-2007-0047961

(51) Int. Cl.
*B41J 2/05*   (2006.01)
(52) U.S. Cl. ............................. 347/63; 347/56
(58) Field of Classification Search .......... 347/20, 347/44, 47, 56, 61–65, 67
See application file for complete search history.

(56) References Cited

U.S. PATENT DOCUMENTS 5,702,567 A * 12/1997 Mitsui et al. ................ 438/689
6,723,643 B1   4/2004 Pan et al.
7,285,226 B2 * 10/2007 Bengali ........................ 216/27

FOREIGN PATENT DOCUMENTS

JP          8167586       6/1996
KR   1020070040395       4/2007

OTHER PUBLICATIONS

Korean Office Action issued Jun. 10, 2011 in KR Application No. 10-2007-0047961.

* cited by examiner

*Primary Examiner* — Juanita D Jackson
(74) *Attorney, Agent, or Firm* — Stanzione & Kim, LLP

(57) ABSTRACT

A MEMS (Micro Electro Mechanical System) device and a method of manufacturing the same, in which an detection indicator is formed on a chamber layer stacked on a substrate such that a user easily inspects whether the chamber layer has a required thickness. The MEMS device can include two detection indicators that are formed on the chamber layer and have different depth from each other, or an detection indicator which is formed on the chamber layer and has a tapered sectional shape in which an upper surface of the detection indicator is gradually narrowed in a downward direction such that a user can easily inspect whether the chamber layer has a required thickness. The user can precisely determine whether the chamber layer is planarized to a required thickness by planarizing the detection indicator formed on the chamber layer, and inspecting the detection indicator by using an optical microscope, thereby facilitating inspection for a thickness of the chamber layer.

9 Claims, 6 Drawing Sheets

MICRO ELECTRO MECHANICAL SYSTEM DEVICE AND METHOD OF MANUFACTURING THE SAME

CROSS-REFERENCE TO RELATED APPLICATIONS

This application claims the benefit of Korean Patent Application No. 10-2007-0047961 filed on May 17, 2007, in the Korean Intellectual Property Office, the disclosure of which is incorporated herein by reference in its entirety.

BACKGROUND OF THE INVENTION

1. Field of the Invention

The present general inventive concept relates to an inkjet print head and a method of manufacturing the same. More particularly, the present general inventive concept relates to a MEMS (Micro Electro Mechanical System) device and a method of manufacturing the same, capable of forming a chamber layer having a uniform thickness.

2. Description of the Related Art

In general, an ink jet print head discharges fine droplets of a printing ink on a required position of a record paper, thereby printing an image having a predetermined color. The ink jet print head includes a thermal driving type ink jet print head, in which a heater is installed in the print head to form bubbles by using a heat generated from the heater and the ink droplets are sprayed due to a pressure of the bubbles.

The thermal driving type ink jet print head includes a substrate, on which a plurality of substance layers including a plurality of heaters for heating the ink are stacked, a chamber layer formed on the substrate to provide a channel and an ink chamber on the substrate, and a nozzle layer, which is formed on the chamber layer and has a nozzle corresponding to the ink chamber.

The nozzle layer has been stacked on an upper surface of the chamber layer as described above. Before the nozzle layer is stacked on the chamber layer, a sacrificial layer is stacked on the chamber layer, the sacrificial layer is planarized through a CMP (Chemical Mechanical Polishing) process, and an inspection is performed to determine whether the chamber layer has a required thickness through the planarization process.

Meanwhile, in the process of planarizing the MEMS device through the CMP process, the sacrificial layer stacked on the chamber layer is primarily planarized, and then the sacrificial layer stacked on the ink chamber of the chamber layer and the chamber layer are simultaneously planarized, thereby controlling a final thickness of the chamber layer.

In this case, if the process of planarizing the MEMS device through the CMP process is insufficiently performed, an upper surface of the chamber layer is not exposed. Thus, when the sacrificial layer is removed, the nozzle layer is not completely bonded to the chamber layer, so that delamination may occur between the above two layers. Further, if the process of planarizing the MEMS device through the CMP process is excessively performed, a thickness of the chamber layer is reduced as compared with an original thickness thereof, so that a volume of the ink droplet is changed, thereby degrading the printing quality.

That is, the process of planarizing the MEMS device through the CMP process must be completed when the chamber layer has a proper thickness. To this end, after the planarization process through the CMP process has been completed, an inspection is performed using an inspection device, such as an optical microscope, to determine if the MEMS device is properly planarized.

However, in the conventional MEMS device, a thickness inspection for the chamber layer using the inspection device such as the optical microscope is performed by calculating a total thickness of the substrate and the chamber layer stacked on the substrate, and then subtracting a thickness of the substrate from the total thickness.

Therefore, according to the related art, a precise inspection on the thickness of the chamber layer is not easy due to irregularity of the substrate on which the chamber layer is stacked, so that a precise inspection such as a destructive inspection must be performed after the MEMS device has been manufactured.

SUMMARY OF THE INVENTION

The present general inventive concept provides a MEMS (Micro Electro Mechanical System) device and a method of manufacturing the same, capable of facilitating inspection for a thickness of the chamber layer.

Additional aspects and utilities of the general inventive concept will be set forth in part in the description which follows and, in part, will be apparent from the description, or may be learned by practice of the general inventive concept.

The foregoing and/or other aspects and utilities of the present general inventive concept can also be achieved by providing a micro electro mechanical system, including a substrate, a chamber layer formed on the substrate and having an ink chamber formed therein, the chamber layer being planarized through a chemical mechanical polishing process; and a detection indicator formed into the chamber layer to indicate the planarization amount of the chamber layer.

The detection indicator can be formed into a predetermined shape that indicates an amount that a height of the detection indicator has been planarized.

Each detection indicator can represent a maximum error margin or a minimum error margin of a thickness of the chamber layer, when the chamber layer is planarized.

Each detection indicator has a groove shape.

Each detection indicator has a trench shape.

The foregoing and/or other aspects and utilities of the present general inventive concept can also be achieved by providing a MEMS device comprising a substrate, a chamber layer stacked on the substrate, the chamber layer having an ink chamber filled with ink and being planarized through a chemical mechanical polishing process, and an detection indicator, which is formed on the chamber layer such that an easy inspection of whether the chamber layer is planarized to a required thickness can be performed, wherein the detection indicator has a tapered sectional shape in which an upper surface of the detection indicator is gradually narrowed in a downward direction.

The detection indicator has a reverse polygonal pyramid shape in which the upper surface of the detection indicator has a polygonal shape.

The detection indicator has a reverse conical shape, in which the upper surface of the detection indicator has a circular shape.

The foregoing and/or other aspects and utilities of the present general inventive concept can also be achieved by providing a method of manufacturing the MEMS device described above, the method comprising the steps of stacking a chamber layer on a substrate, forming an detection indicator on the chamber layer, stacking a sacrificial layer on the chamber layer having the detection indicator, planarizing the sacrificial layer through a chemical mechanical polishing process and planarizing the chamber layer to a required thickness, determining whether the chamber layer is properly planarized by inspecting the thickness of the planarized chamber layer and stacking a nozzle layer on the chamber layer In the operation of forming the detection indicator, first and second detection indicators, which have different depth from each other, are formed, and the first and second detection indicators represent a maximum error margin and a minimum error margin of the thickness of the planarized chamber layer, respectively.

Each detection indicator can be formed through a dry etching process.

Each detection indicator can be formed through a stereo lithography process.

The determining whether the chamber layer is properly planarized is performed by inspecting whether the first detection indicator is polished and the second detection indicator remains on the chamber layer.

In the operation of forming the detection indicator, detection indicator is formed to have a tapered shape, in which an upper surface of the detection indicator is gradually narrowed in a downward direction.

The detection indicator can be formed through an imprinting process.

The operation of determining whether the chamber layer is properly planarized is performed by adding a distance between the substrate and a vertex of the detection indicator to a height of the planarized detection indicator.

The height of the detection indicator can be obtained by multiplying a half width of the upper surface of the planarized detection indicator by a tangent value of an angle formed between an extension line of the vertex of the detection indicator and a hypotenuse of the detection indicator.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
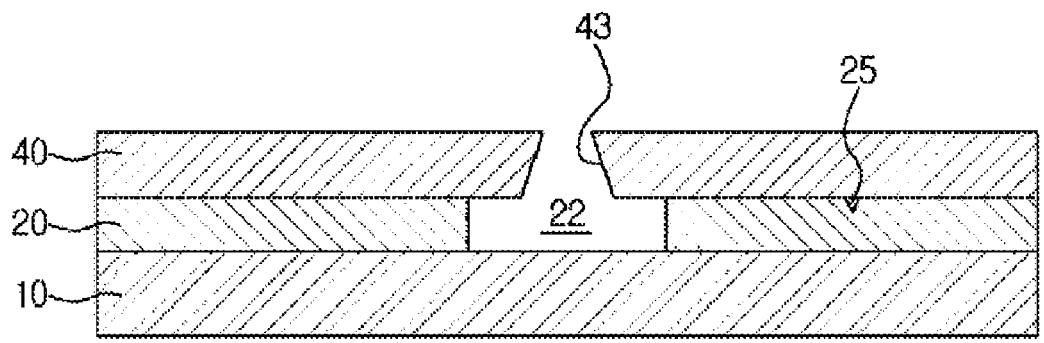
FIG. 1 is schematic views representing a MEMS (Micro Electro Mechanical System) device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A size and a thickness of the elements illustrated in the drawings may be exaggerated for the purpose of clarity of explanation.

As illustrated in FIG. 1, the MEMS device includes a substrate 10 on which a plurality of substance layers are formed, a chamber layer 20 that is stacked on the substrate 10 to provide a channel and an ink chamber 22, and a nozzle layer 40 that is stacked on the chamber layer 20 and has a nozzle 43 corresponding the ink chamber 22.

The substrate 10 typically includes a silicon substrate. A plurality of heaters (not shown) are formed on the substrate to heat ink, and the heater includes a heating resistor made from a tantalum-aluminum alloy, tantalum nitride, titanium nitride or tungsten silicide. An insulation layer (not shown) typically including silicon oxide is formed between the heater and the substrate 10 to insulate the heater from the substrate 10. In addition, a conductor (not shown) is formed on the heater to apply a current to the heater, and a passivation layer (not shown) is formed on surfaces of the heater and the conductor to protect the heater and the conductor. Due to the passivation layer, the heater and the conductor can be prevented from being oxidized or directly making contact with the ink.

As mentioned above, the chamber layer 20 is stacked on substrate 10 including the substance layers having the heater, the insulation layer, the conductor and the passivation layer. In this case, the chamber layer 20 is formed by using a photosensitive polymer including epoxy or imide, and the ink channel is formed in the chamber layer 20. The ink channel includes an ink chamber 22 filled with the ink and an ink feed hole (not shown) that discharges the ink filled in the ink chamber.

When the MEMS device is manufactured, a sacrificial layer 30 (see, FIG. 3C) is stacked on the chamber layer 20 to form a space for the channel. The sacrificial layer 30 and the chamber layer 20 are polished using a CMP (Chemical Mechanical Polishing) device 33 (see FIG. 3D) such that the chamber layer 20 has a required thickness. In addition, an detection indicator 25 is formed on the chamber layer 20 to facilitate inspection of the thickness of the chamber layer 20. This will be described later in more detail.

The nozzle layer 40 is stacked on an upper surface of the chamber layer 20 as described above, and the nozzle layer 40 includes the photosensitive polymer similar to the chamber layer 20.

Figure 2A:
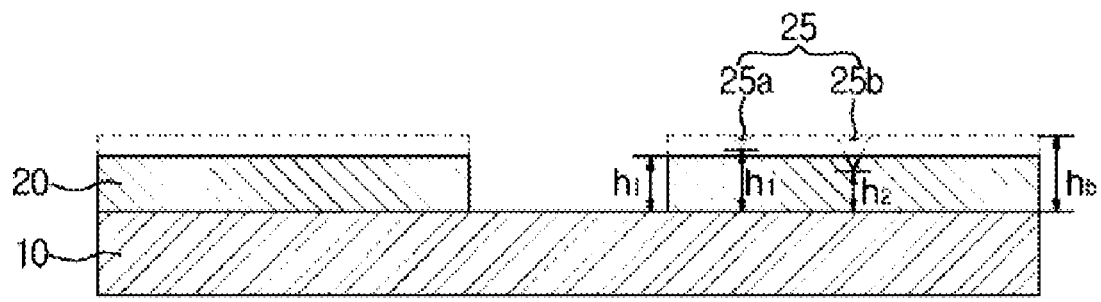
FIGS. 2A to 2B are schematic views representing a MEMS device according to another embodiment of the present general inventive concept.

Meanwhile, according to an embodiment of the present general inventive concept, the detection indicator 25 is formed on the upper surface of the chamber layer 20 to inspect whether the chamber layer 20 is planarized to a required thickness. As illustrated in FIG. 2A, the detection indicator 25 can include a first detection indicator 25a and a second detection indicator 25b that have a different depth with respect to each other, and the detection indicators 25a and 25b can be formed through a dry etching process or a stereo lithography process.

In this case, the first detection indicator 25a represents a maximum error margin of the thickness of the chamber layer 20 and the second detection indicator 25b represents a minimum error margin of the thickness of the chamber layer 20 when the chamber layer 20 is planarized through the CMP process.

Figure 2B:
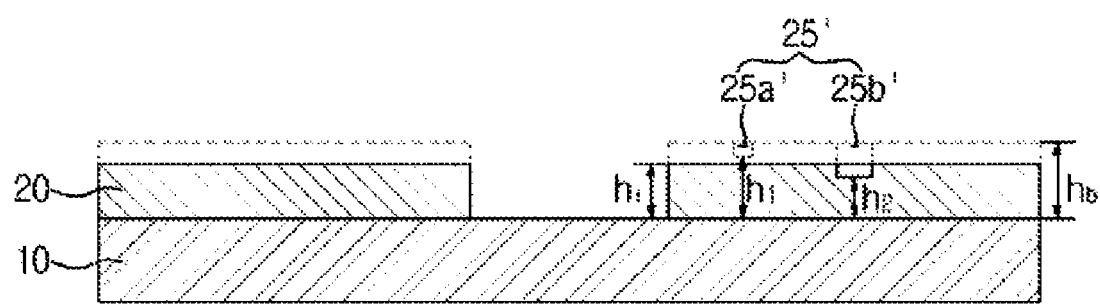

In addition, the detection indicators 25a and 25b can have a groove shape, as illustrated in FIG. 2A, or the detection indicators 25a' and 25b' can have a trench shape, as illustrated in FIG. 2B. Referring to FIGS. 2A and 2B, hb represents a basic height of the chamber layer 20 stacked on the substrate 10, h1 represents a height of the first detection indicators 25a and 25a', h2 represents a height of the second detection indicators 25b and 25b', and hi represents a height of the chamber layer 20 having a desired thickness required by the user.

Figure 3A:
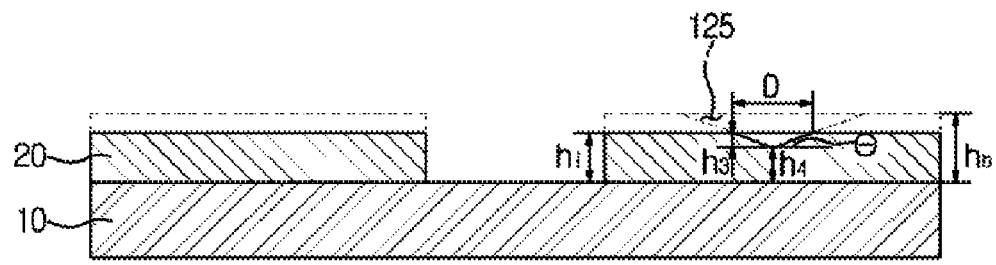
FIGS. 3A to 3C are views presenting a process of manufacturing a MEMS device according to an embodiment of the present general inventive concept.
Figure 3B:
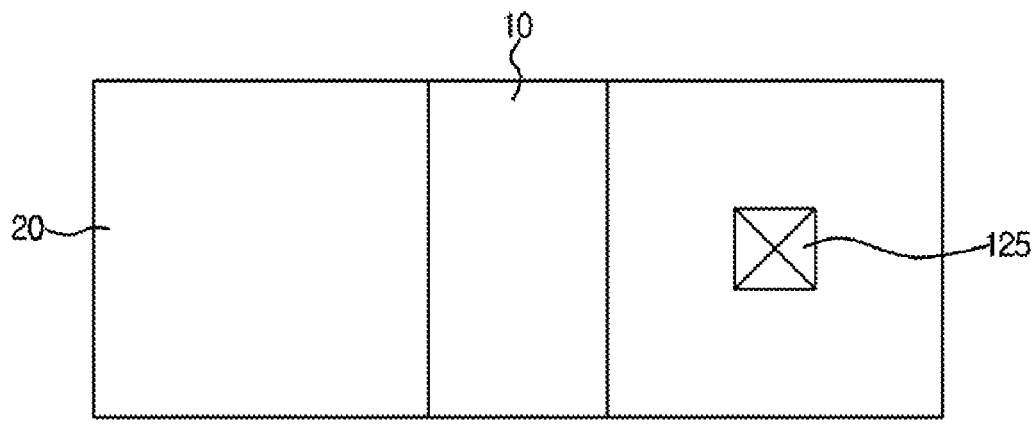
Figure 3C:
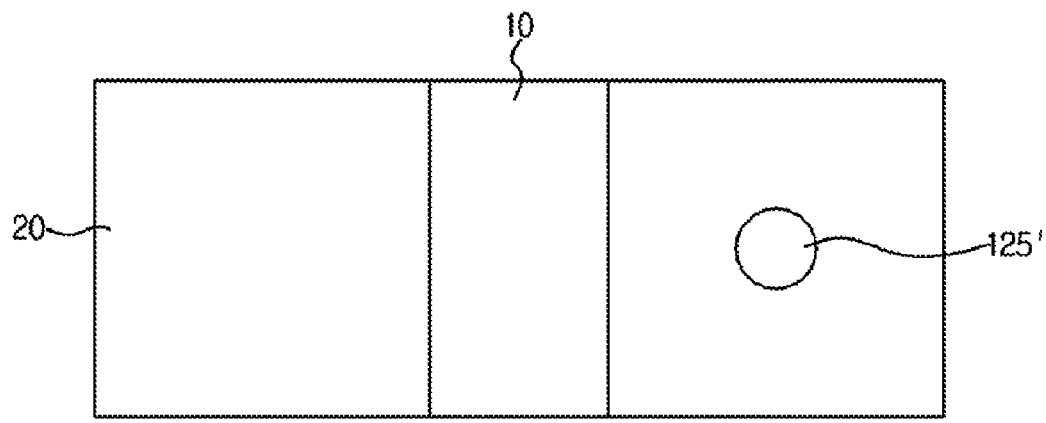

In addition, as illustrated in FIG. 3A, in the MEMS device according to the embodiments of FIGS. 3A to 3C, the a third detection indicator 125 has a tapered sectional shape, in which an upper surface of the third detection indicator 125 is gradually narrowed in a downward direction as the chamber layer 20 is planarized.

In this case, the third detection indicator 125 is formed through an imprinting process in which heat and pressure are simultaneously applied to the chamber layer 20. As illustrated in FIG. 3B representing a plan view of the MEMS device, the third detection indicator 125 has an inverse square pyramid shape in which the upper surface of the third detection indicator 125 has a square shape. However, as illustrated in FIG. 3C representing another exemplary plan view of the MEMS device, the third detection indicator 125 may have a reverse conical shape in which the upper surface of the third detection indicator 125 has a circular shape. Referring to FIG. 3A, hb represents the basic height of the chamber layer 20 stacked on the substrate 10, and h3 represents a depth of the planarized third detection indicator 125, h4 represents a height measured from a bottom surface of the chamber layer 20, that is, from the substrate 10 to an vertex of the third detection indicator 125, hi represents a height of the chamber layer 20 having a desired thickness required by the user, D represents a width of the upper surface of the planarized third detection indicator 125, and □θ represents an angle formed between an extension line of the vertex of the third detection indicator 125 and a hypotenuse of the third detection indicator 125.

Hereinafter, methods of manufacturing the MEMS device according to a few embodiments of the present general inventive concept will be described with reference to accompanying drawings. FIGS. 4A to 4G are sectional views sequentially representing a procedure of manufacturing the MEMS device according to an embodiment of the present general inventive concept.

Figure 4A:
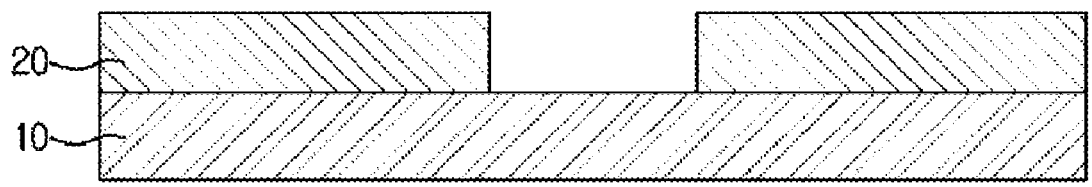
FIGS. 4A to 4G are sectional views sequentially representing a procedure of manufacturing the MEMS device according to an embodiment of the present general inventive concept.

First, as illustrated in FIG. 4A, the chamber layer 20 defining the ink chamber 22 is stacked on the substrate 10 including a plurality of substance layers. The ink chamber 22 can be formed by partially etching the chamber layer 20.

Figure 4B:
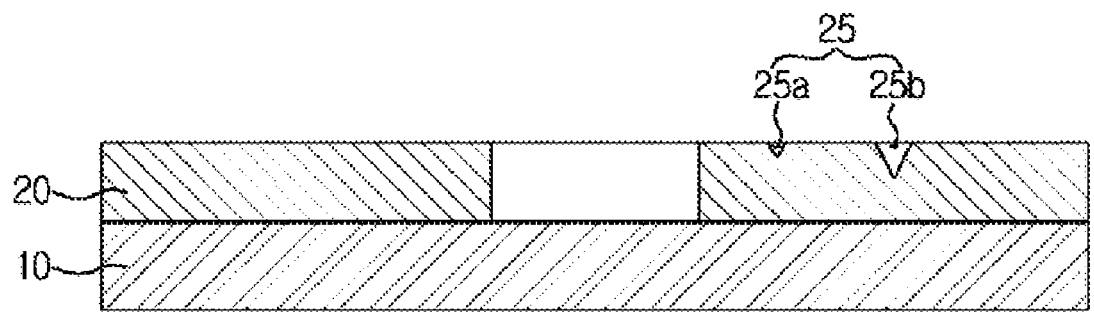

As illustrated in FIG. 4B, after the chamber layer 20 has been stacked on the substrate 10, the detection indicator 25 is formed at one side of the chamber layer 20. In detail, the first detection indicator 25a and the second detection indicator 25b having a different depth with respect to each other are formed on the chamber layer 20. In this case, the first detection indicator 25a represents the maximum error margin of the thickness of the chamber layer 20 when the chamber layer 20 is planarized, and the second detection indicator 25b represents the minimum error margin of the thickness of the chamber layer 20.

Figure 4C:
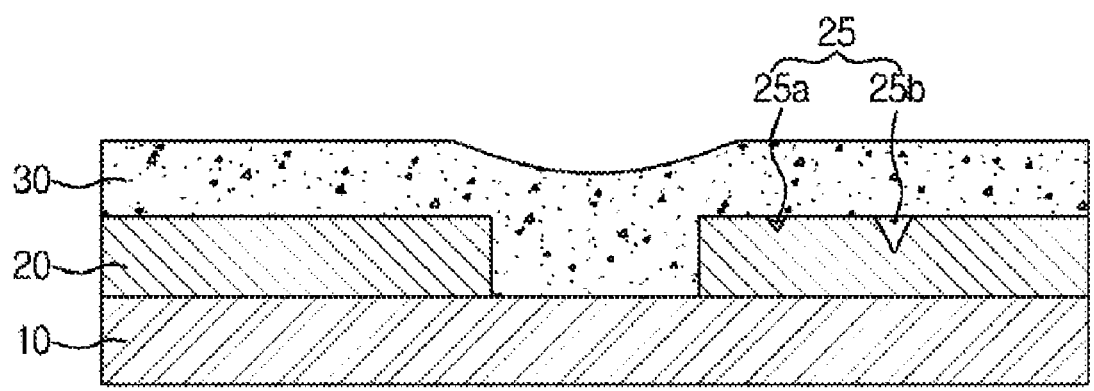

As illustrated in FIG. 4C, after the detection indicators 25a and 25b having a different depth with respect to each other have been formed on the chamber layer 20, a sacrificial layer 30 is stacked on an upper surface of the chamber layer 20 and an upper surface the substrate 10 which is exposed due to the formation of the ink chamber 22.

Figure 4D:
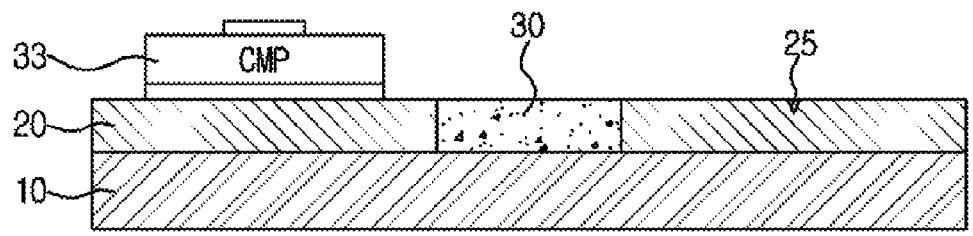

After the sacrificial layer 30 has been stacked on the chamber layer 20, as illustrated in FIG. 4D, the sacrificial layer 30 and a portion of chamber layer 20 are planarized by the CMP device 33. According to embodiments of the present general inventive concept, different from the typical ink jet print head where only the sacrificial layer 30 is planarized, the chamber layer 20 of the MEMS device is partially planarized, thereby limiting the thickness of the chamber layer 20.

Figure 4E:
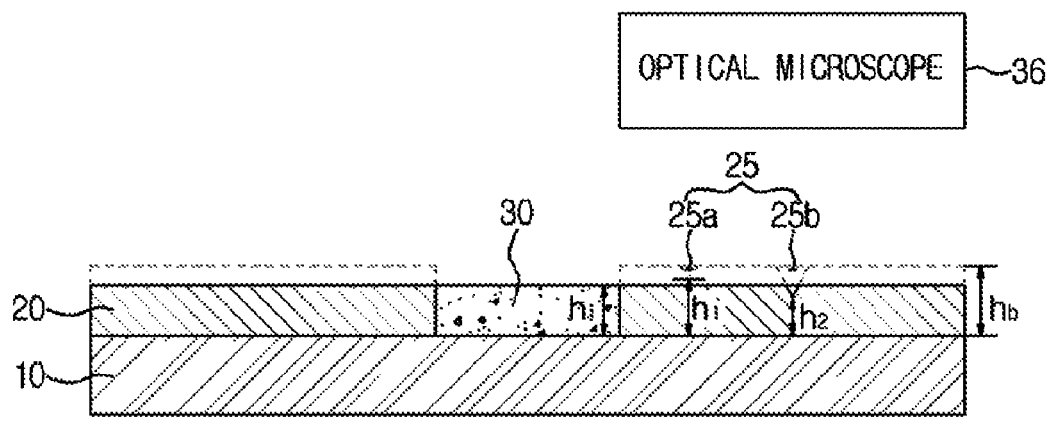

After the sacrificial layer 30 and some of chamber layer 20 have been planarized, as illustrated in FIG. 4E, an inspection is performed to determine whether the chamber layer 20 is planarized to the required thickness. The thickness inspection of the chamber layer 20 is performed by means of the optical microscope 36.

When the thickness of the chamber layer 20 is inspected, if the first detection indicator 25a is not detected while the second detection indicator 25b is detected, it means that the chamber layer 20 is normally planarized. That is, if the height of the chamber layer 20 is positioned between the height h1 of the first detection indicator 25a and the height h2 of the second detection indicator 25b, it means that the chamber layer 20 is normally planarized.

In addition, when the thickness of the chamber layer 20 is inspected, if the first and second detection indicators 25a and 25b are simultaneously detected, it means that the chamber layer 20 is insufficiently planarized, so that the CMP process must be performed again. Further, in the thickness inspection of the chamber layer 20, if the first and second detection indicators 25a and 25b are not detected, it means that the chamber layer 20 is excessively planarized, so that that the MEMS device is discarded.

Figure 4F:
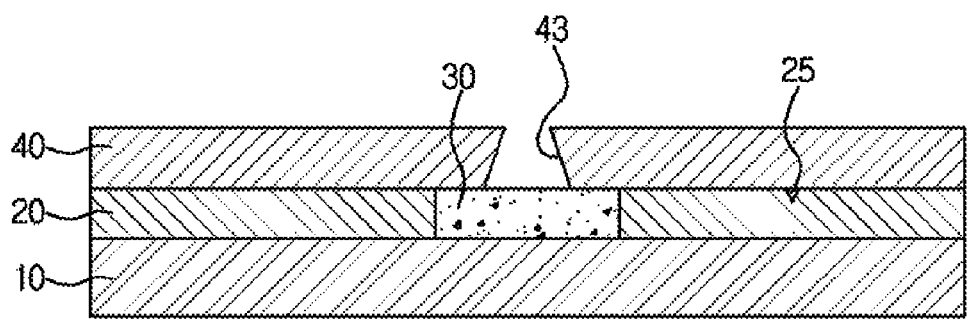

After the thickness inspection of the chamber layer 20 has been completed, as illustrated in FIG. 4F, the nozzle layer 40 is stacked on the upper surface of the chamber layer 20. The nozzle layer 40 has the nozzle 43 to discharge the ink filled in the ink chamber 22.

Figure 4G:
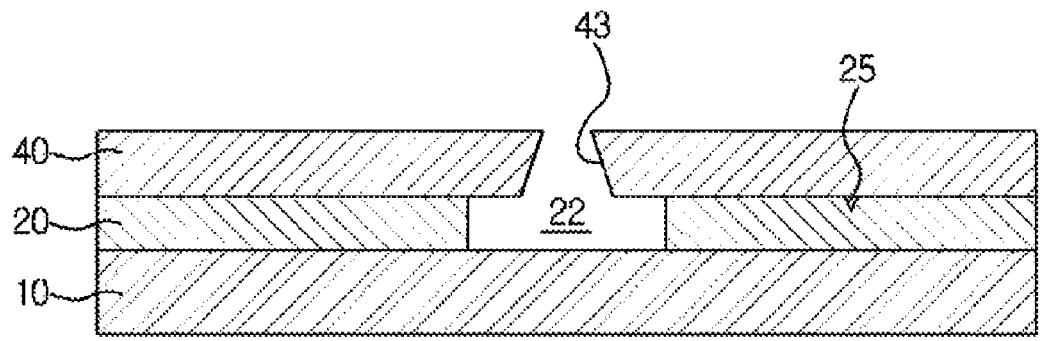

After the nozzle layer 40 has been formed, as illustrated in FIG. 4G the sacrificial layer 30 is removed and the ink feed hole (not shown) is formed on the substrate 10, thereby completing fabrication of the MEMS device.

Accordingly, in the MEMS device according to the present general inventive concept, a precise inspection through the optical microscope 36 can be achieved by using the detection indicator 25 formed on the chamber layer 20 after the chamber layer 20 is planarized, so that a destructive conventional inspection does not need to be performed after completing fabrication of the MEMS device, thereby facilitating the inspection for the thickness of the chamber layer 20.

FIGS. 5A to 5D are views representing a method of manufacturing a MEMS device according to another embodiment of the present general inventive concept. Since this embodiment is to the same as the previous embodiment except for the operations of forming the detection indicator and inspecting the thickness of the chamber layer, the details thereof will be omitted.

Figure 5A:
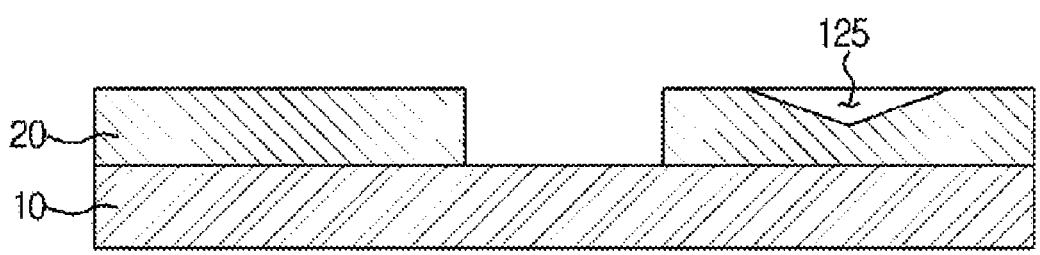
FIGS. 5A to 5D are views representing a method of manufacturing a MEMS device according to another embodiment of the present general inventive concept.

As illustrated in FIG. 5A, after the chamber layer 20 has been stacked on the substrate, an third detection indicator 125 is formed at one side of the chamber layer 20 through the imprinting process. In this case, the third detection indicator 125 has a tapered sectional shape in which the upper surface of the third detection indicator 125 is gradually narrowed in a downward direction as the chamber layer 20 is planarized.

Figure 5B:
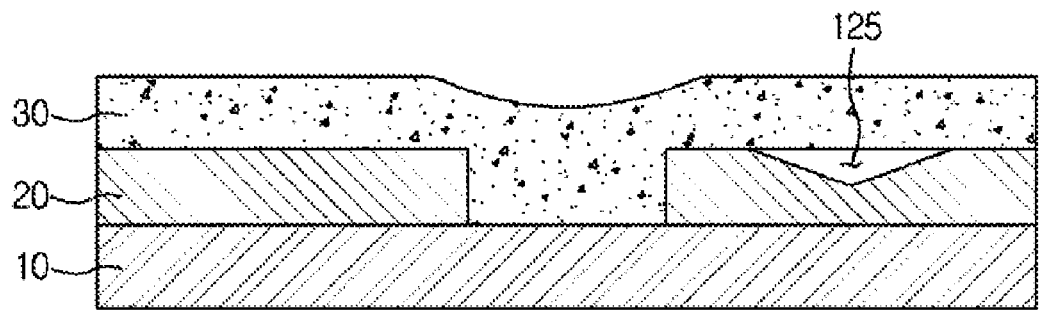

After the third detection indicator 125 has been formed on the chamber layer 20, as illustrated in FIG. 5B, the sacrificial layer 30 is stacked on the chamber layer 20.

Figure 5C:
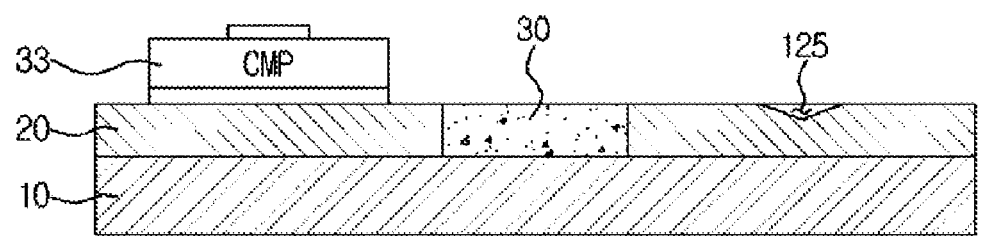

After the third detection indicator 125 has been formed on the chamber layer 20, as illustrated in FIG. 5C, the sacrificial layer 30 and a portion of the chamber layer 20 are planarized through the CMP device. Different from the typical ink jet print head where only the sacrificial layer 30 is planarized, according to the present general inventive concept, the chamber layer 20 of the MEMS device is partially planarized, thereby limiting the thickness of the chamber layer 20.

Figure 5D:
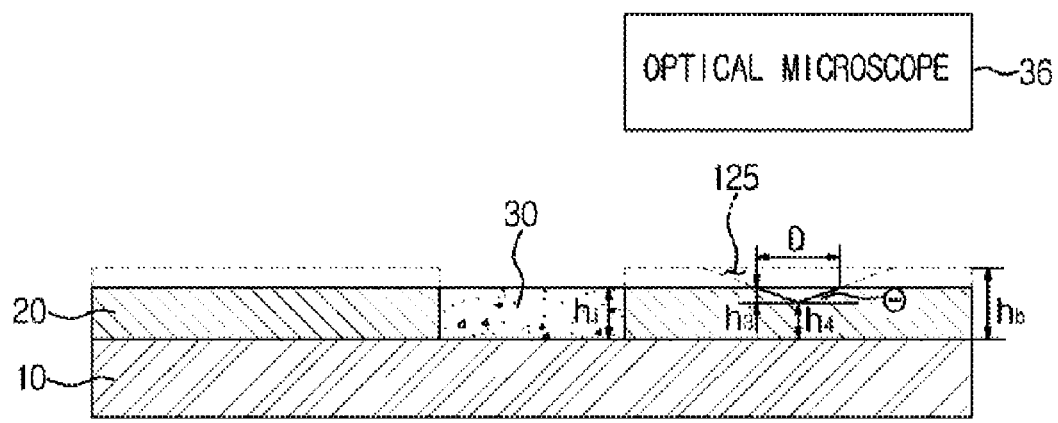

As the sacrificial layer 30 and a portion of the chamber layer 20 have been planarized, as illustrated in FIG. 5D, the inspection is performed to determine whether the chamber layer 20 is planarized to a required thickness. The thickness inspection of the chamber layer 20 is performed by means of an optical microscope 36, similarly to the previous embodiment.

That is, the thickness of the chamber layer 20 is obtained by adding a depth h3 of the planarized third detection indicator 125 to a distance h4 between the substrate and a vertex of the third detection indicator 125. In this case, the depth h3 of the planarized third detection indicator 125 is obtained by multiplying a half width D of the upper surface of the planarized third detection indicator 125 by a tangent value of the angle □θ formed between the parallel extension line of the vertex of the third detection indicator 125 and the hypotenuse of the third detection indicator 125.

The angle □θ formed between the extension line of the vertex of the third detection indicator 125 in the horizontal direction and the hypotenuse of the third detection indicator 125 can be determined by third detection indicator 125 is measured by the optical microscope, the thickness of the chamber layer 20 can be easily inspected.

In addition, when the thickness of the chamber layer 20 is inspected, if the chamber layer 20 is less planarized than required by a user, the CMP process can be performed once again, and if the chamber layer 20 is over polished, the MEMS device is discarded.

Accordingly, in the MEMS device according to the various embodiments of the present general inventive concept, a precise inspection through the optical microscope 36 is performed due to the third detection indicator 125 formed on the chamber layer 20 after the chamber layer 20 has been planarized, so that a destructive conventional inspection does not need to be performed after completing fabrication of the MEMS device, thereby facilitating the inspection for the thickness of the chamber layer 20.

As described above, according to the MEMS device and the methods of manufacturing the same according to the various embodiments herein, the thickness of the chamber layer can be easily inspected by inspecting an detection indicator formed on a chamber layer using an optical microscope after the chamber layer has been planarized.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A micro electro mechanical system device, comprising:
a substrate;
a chamber layer formed on the substrate and having an ink chamber formed therein, the chamber layer being planarized through a chemical mechanical polishing process; and
a detection indicator formed into the chamber layer to indicate the planarization amount of the chamber layer.

2. The micro electro mechanical system device as claimed in claim 1, wherein the detection indicator is formed into a predetermined shape that indicates an amount that a height of the detection indicator has been planarized.

3. The micro electro mechanical system device as claimed in claim 2, wherein the detection indicator include a first and second detection indicators, which have different depth from each other.

4. The micro electro mechanical system device as claimed in claim 3, wherein the first and second detection indicator represent a maximum error margin and a minimum error margin of a thickness of the chamber layer, respectively, when the chamber layer is planarized.

5. The micro electro mechanical system device as claimed in claim 4, wherein each detection indicator has a groove shape.

6. The micro electro mechanical system device as claimed in claim 4, wherein each detection indicator has a trench shape.

7. The micro electro mechanical system device as claimed in claim 2, wherein the detection indicator include a third detection indicator has a tapered sectional shape in which an upper surface of the third detection indicator is gradually narrowed in a downward direction.

8. The micro electro mechanical system device as claimed in claim 7, wherein the third detection indicator has a reverse polygonal pyramid shape in which the upper surface of the third detection indicator has a polygonal shape.

9. The micro electro mechanical system device as claimed in claim 7, wherein the third detection indicator has a reverse conical shape, in which the upper surface of the third detection indicator has a circular shape.

* * * * *